Patented Mar. 7, 1944

2,343,438

UNITED STATES PATENT OFFICE 2,343,438

FILTER

Donald H. Wells, Maplewood, N. J., and Melvin De Groote, University City, Mo., assignors to Purolator Products, Inc., Newark, N. J., a corporation of Delaware No Drawing. Application October 18, 1941, Serial No. 415,650

13 Claims. (Cl. 252—326)

This invention relates to filtration and filters therefor and relates more particularly to filtration of lubricating oil of an internal combustion engine for the removal of solids therefrom.

The lubricating oil of an internal combustion engine, particularly a Diesel type engine, contains minute solids which filtering media, such as cloth, paper, cotton linters, wood pulp and the like, require considerable time to remove. The dirt removal rate of such filtering media depends upon a number of different conditions such as, in depth type filters, the method of assembling the medium, the density of the packing of the medium, the distribution of the oil passing therethrough, temperature, pressure and a number of other variables. In filters of the extended area type, the amount of surface area, temperature, pressure, viscosity of the oil and other factors affect the dirt removal rate.

An object of this invention is to increase sharply the dirt removal rate of filtering media of the types above mentioned.

We have found that in filtering lubricating oil of internal combustion engines, the dirt removal rate of a filtering medium may be sharply increased by contacting oil in the lubricating system of the engine that is filtered by the filtering medium, with a drastically oxidized dehydrated ricinoleic acid body, for example, the oxidized product obtained by the partial dehydration of ricinoleic acid by pyrolytic procedure or, more advantageously, the product obtained by the oxidation of partially dehydrated castor oil, i. e., the glyceride instead of the fatty acid.

The drastically oxidized dehydrated ricinoleic acid body, preferably oxidized dehydrated castor oil, may be added to the filtering medium in order to increase the dirt removal rate of the filtering medium, or may be contacted in some other way with the oil in the system that passes through the filtering medium. Preferably the oxidized material of the kind herein contemplated is used, according to this invention, by including it in a filter for use in the lubricating system of an internal combustion engine, so as to provide an improved filter having high dirt removal rate.

The expression "ricinoleic acid bodies" is intended to refer to ricinoleic acid, polyricinoleic acid, and particularly the glycerides of ricinoleic acid. Specifically the expression includes monoricinolein, diricinolein, ricinoleic acid, etc. Castor oil of commerce contains approximately 85–90% of triricinolein, and due to its availability and low cost, is the preferred raw material employed in manufacturing the compound intended to increase the dirt removal rate in filtering systems of the kind indicated.

It is well known that ricinoleic bodies which have not been subjected to pyrolytic dehydration, may be oxidized in various manners. This is usually accompanied by subjecting a ricinoleic body to treatment, such as, blowing with a suitable gaseous oxidizing medium, e. g., air, oxygen, ozone, or ozonized air. Such oxidation is commonly carried out at ordinary or super-atmospheric pressure (up to about 200 pounds per square inch) either moist or dry; and in the presence or absence of a catalyst, such as lead oleate, cobalt linoleate, or manganese oleate, or such as, alpha pinene or linseed oil, etc. Care should be taken, however, not to permit temperature rise such that excessive pyrolytic decomposition would take place. The oxidation may be vigorous as by vigorous blowing, or may be more gradual as by exposure in thin films to air provided the oxidation is sufficiently prolonged to obtain the desired drastic oxidation. Usually the time required is at least about 8 to 10 hours under conditions most favorable to oxidation, e. g., blowing at a relatively high temperature, and for certain fatty bodies much more prolonged oxidation, e. g., several days or even weeks is desirable, especially under conditions less favorable to rapid oxidation. In any event, whether the oxidation is produced by continued mild oxidation or by more vigorous oxidation, a condition of drastic oxidation is indicated by changes in chemical and physical attributes of the material. These changes are usually indicated by a lowered iodine value, an increased saponification value, usually an increased acetyl value, an increased specific gravity, and an increased refractive index. Thus, the iodine number may become less than 70 and even as low as about 40. The saponification value may be about 215 to about 283 and the acetyl value may be about 160 to about 200. The viscosity is increased and the drastically oxidized product may become very heavy and stiff at ordinary temperatures. The refractive index is also increased. The color of the drastically oxidized material may be a pale yellow or light amber or may be a deep orange color. If oxidation is carried on long enough a product of liver-like consistency and dark color is obtained, but since such material is more difficult to utilize as an agent to increase the dirt removal rate of filtering media those drastically oxidized ricinoleic bodies which are pale blown and have some fluidity at normal temperatures are preferred.

The same sort of procedure which is used to oxidize ricinoleic acid bodies which have not been subjected to pyrolytic dehydration, such as ordinary castor oil of commerce, may also be employed to oxidize dehydrated castor oil or similar material of the kind herein intended as a primary raw material. Generally speaking, however, the following modifications should be kept in mind:

Such materials are apt to contain at least a significant amount of octadecadiene 9,11-acid-1 or its ester, which is recognized as a powerful catalyst for promoting oxidation of castor oil or similar materials. Thus, it is rarely necessary to add any catalyst to hasten oxidation. Furthermore, it is rarely necessary to oxidize under pressure, although such procedure may be employed. It is rarely necessary to use oxygen instead of air. It is rarely necessary to oxidize at a temperature above 120° C. Thus, notwithstanding the fact that any of the usual procedures employed for oxidizing castor oil may be employed for oxidizing dehydrated castor oil, yet generally speaking, considerably less drastic conditions are required. Furthermore, the time element can be decreased greatly. The same sort of apparatus and the same sort of procedure is employed as in the case of conventional oxidation of castor oil. Since dehydrated castor oil is already polymerized to a greater or lesser degree and perhaps has initial viscosity considerably greater than that of castor oil, it is obvious that the final stages of oxidation must be carried out more cautiously, and that excessive oxidation may produce a solid or spongy or rubber-like material without previous indication of the imminent critical stage. In any event, the material prior to oxidation should be analyzed and oxidation should be conducted until there is a significant change as indicated by increase in viscosity, change in such indices as iodine number, hydroxyl number, etc., all of which is obvious to those skilled in the art. As a matter of fact, unless one desires to do so, there is no need to oxidize such dehydrated castor oil, insofar that various products of this kind are sold commercially and used in other arts which have no particular connection with the usage herein contemplated.

Castor oil or similar materials of the kind described have been dehydrated, and such dehydrated materials used for various other purposes, for instance, as substitutes for drying oils, as plasticizers in the manufacture of resins, as ingredients entering into the compounding of insulating materials, etc. Generally speaking, the conventional procedure is to subject a quantity of castor oil to destructive distillation, approximately 250°–310° C., and generally 250°–285° C. until at least 5–15% of the original volume has been removed as a distillate. Sometimes the procedure is conducted primarily to recover the distillate, due to its high content of heptaldehyde. Generally speaking, the lower limits of the material distilled off are approximately 8–10%, and the upper limits, possibly 15–23%. In some instances pyrolysis is conducted in presence of an added catalyst, which may permit the reaction, i. e., the degradation or destructive distillation, to take place at lower temperature; and sometimes vacuum is employed or both vacuum and a catalyst. Such procedure of subjecting a ricinoleic acid body, and especially ricinoleic acid or castor oil, to a pyrolysis, is so well known that no further elaboration is required. However, for convenience reference is made to the following patents, which clearly describe the procedure, and in some instances point out at least some of the complicated chemical changes that take place: U. S. 1,240,565, Harris, Sept. 18, 1917; 1,749,463, Bertsch, March 4, 1930; 1,799,420, Holton, April 7, 1931; 1,886,538, Fanto, Nov. 8, 1932; 1,892,258, Ufer, Dec. 27, 1932; 2,156,737, Priester, May 2, 1939; 2,195,225, Priester, Mar. 26, 1940; and British 306,452, Scheiber, May 9, 1930.

As to a comparative evaluation of various dehydration catalysts for castor oil, see "Masloboino-Zhirovanya Prom.," 16, No. 5/6 33–8 (1940).

The products which we prefer to use in increasing dirt removal rate are blown dehydrated castor oils having substantially the following identifying characteristics within the ranges indicated:

| | |
|---|---|
| Acid number | 14.0 to 25.0 |
| Saponification number | 195 to 240 |
| Iodine number | 70 to 95 |
| Hydroxyl number | 63.0 to 80.0 |
| Reichert-Meissel number | Less than 5 |
| Acetyl number | 60 to 75 |
| Per cent unsaponifiable matter | Generally less than 3 |
| Per cent nitrogen | 0.0 |
| Per cent SO₂ | 0.0 |
| Per cent ash | Trace |
| Specific gravity at 31° C | About 0.9574 |
| Refractive index at 31° C | About 1.4795 |
| Color | Straw or light amber |

A specific example of a very desirable oxidized dehydrated castor oil for use in the practice of this invention and which is available in the open market, has approximately the following specific characteristics:

| | |
|---|---|
| Acid number | 18.1 |
| Saponification number | 216.5 |
| Iodine number | 83 |
| Acetyl number | 68 |
| Hydroxyl number | 71.4 |
| Reichert-Meissel number | 2.0 |
| Per cent unsaponifiable | Less than 2.5 |
| Per cent nitrogen | 0.0 |
| Per cent SO₂ | 0.0 |
| Per cent ash | Trace |
| Specific gravity at 31° C | 0.9574 |
| Refractive index at 31° C | 1.4795 |

The above values or similar values are of assistance in indicating and characterizing a material of the kind herein contemplated. For instance, although the entire chemistry of the dehydration of castor oil is not known, yet obviously there must be a marked reduction in the acetyl or hydroxyl value, and simultaneously an increase in the iodine value. Also, such pyrolytic reaction tends to eliminate the low molal or volatile acids. On oxidation of such material, the acetyl value or hydroxyl value may stay constant or increase. But in any event the iodine value is reduced until it begins to approximate that of castor oil or ricinoleic acid prior to dehydration, or somewhat lower. The fact that the acetyl value or hydroxyl value does not increase proportionally with the drop in the iodine value is, of course, due to either the formation of ether type compounds, or oxides which do not give a hydroxyl or acetyl value, or else due to the formation of ester acids or similar reactions. It is generally desirable that the iodine number of the drastically oxidized dehydrated castor oil be not less than 70, that the saponification value be within the range 195 to 200 and that the acetyl value be within the range of 60 to 75.

The drastically oxidized dehydrated castor oil or other drastically oxidized dehydrated ricinoleic body, when used in conjunction with a filter, sharply increases the dirt removal rate of the filter. The material may be used in a number of different ways. Thus, in a paper type filter the product, either by itself or mixed with a solvent such as alcohol, preferably is applied to the surface of the paper covering all or a portion of the total paper surface exposed to oil. Cloth filters may be similarly treated. Cotton linters filters preferably are treated by adding the product either diluted or undiluted to the cotton linters either on the surface or throughout the body thereof. Other filtering mediums sufficiently porous to permit oil to flow therethrough but sufficiently compact to filter out solid particles may be similarly treated. The product is also effective when incorporated in the filter or filter medium in other ways than those above mentioned. Moreover, whenever the product is permitted to contact oil that passes through a filtering medium it is effective to increase the rate of dirt removal of the filtering medium. Thus, if the product is applied to a screen or the like, through or past which the oil flows before reaching the filtering medium, the dirt removal rate of the filtering medium is increased. If the material is merely introduced into the casing within which the filtering medium is contained, it is effective.

The amount of the product that is used depends upon the increase in dirt removal rate that is desired. Ordinarily, for commercial purposes, a small amount, such as about 2 to 25 grams, is all that is desirable for use in connection with a filter of proper size for the average automobile. Use of as little as 4 grams gives a very pronounced increase in dirt removal rate and the dirt removal rate is only slightly increased by using 5 or 6 times this amount.

As above mentioned, the use of an additive of the type above defined sharply increases the dirt removal rate. In other words, when a filtering operation is carried on using these additives in connection with a filter, a single filter can remove dirt as fast as the dirt could be removed by the use of a plurality of untreated filters. In thus increasing the dirt removal rate, the improved result is secured chiefly through a greater removal of solids in a single passage through the filtering medium.

The improvements in the rate of dirt removal from lubrication oil that may be effected by the additives herein defined, have been tested by the following procedure. From a heated tank containing six quarts of oil, oil was withdrawn by a pump and forced continuously at 45 pounds per square inch pressure into a standard type automobile filter and the filtered oil was returned to the tank. Starting with clean oil, 5 grams of solids of the type formed in automobiles were added to the oil in the tank in such manner as to be thoroughly distributed throughout the oil in the tank, and observation was made of this oil to determine the number of minutes required to clean it to .02% solid content after each addition of the dirt. At two-hour intervals, additional 5-gram dirt charges were added and observations made of the length of time required to clean the oil in the tank to .02% solids after each dirt addition. Comparative tests were run with two sets of similar filters, the filters of one set being treated with the additive and the filters of the other set not being so treated. After each filter had reached the condition where oil in the tank contained .1% solids two hours after the dirt was added, the amount of dirt in the filter was determined by subtracting the amount of dirt remaining in the tank from the amount of dirt added during the test. The results for each set of filters were averaged. Using the products above described, it was found that the treated filter cleaned up the first addition of dirt much more rapidly than with the untreated filter and with subsequent dirt additions, the advantage in favor of the treated filter persisted. The life of the treated filter was not materially greater than that of the untreated filter.

According to this invention, additives that sharply increase the dirt removal rate of filtering media are made available which retain their effectiveness for the full life of the filter, withstand the temperatures encountered in internal combustion engine lubrication without volatilization, remain absorbed or deposited on the filtering medium during its use, and impart no injurious effects to the oil being filtered. The additive may be used without requiring any material change in the manufacture of the filter. Because of the faster dirt removal rate resulting from the use of the additive, the treated filter reduces the accumulation of solid particles and abrasive matter in the lubricant materially below that obtainable by a similar filter that has not been treated and thereby enhances the efficacy of the lubricant.

While this invention has been described in connection with a number of examples of products suitable for use in increasing the dirt removal rate of filtering media according to this invention, it is to be understood that this has been done merely for the purpose of illustration and exemplification and that the scope of this invention is to be governed by the language of the following claims considered in the light of the foregoing description.

We claim:

1. A filter for use in connection with the lubricating system of an internal combustion engine, said filter comprising a casing containing a filtering medium which is sufficiently porous to permit oil to flow through but sufficiently compact to filter out said particles, and said filter comprising for contact with oil passing therethrough, an agent for increasing the dirt removal rate of said filtering medium, and said agent comprising a drastically oxidized dehydrated ricinoleic acid body.

2. A filter according to claim 1, wherein said drastically oxidized dehydrated ricinoleic acid body is drastically oxidized dehydrated castor oil.

3. A filter according to claim 1, wherein said drastically oxidized dehydrated ricinoleic acid body is drastically oxidized castor oil obtained by oxidation of dehydrated castor oil derived by a pyrolytic step in which the amount of distillate removed from the recovered residue was equal to at least about 8% and not more than about 23% by volume of the original castor oil.

4. A filter according to claim 1, wherein said drastically oxidized dehydrated ricinoleic acid body is drastically oxidized dehydrated castor oil obtained by oxidation of dehydrated castor oil derived by a pyrolytic step in which the amount of distillate removed from the recovered residue was equal to at least about 8% and not more than about 23% by volume of the original castor oil; with the added proviso that the iodine number of said oxidized product is not less than 70, the saponification value within the range of about 195 and about 240, and acetyl value within the range of about 60 to about 75.

5. A filter according to claim 1, wherein said drastically oxidized dehydrated ricinoleic acid body is drastically oxidized castor oil obtained by oxidation of dehydrated castor oil derived by a pyrolytic step in which the amount of distillate removed from the recovered residue was equal to at least about 8% and not more than about 23% by volume of the original castor oil; with the added proviso that the oxidized dehydrated castor oil has approximately the following characteristics:

| | |
|---|---|
| Acid number | 18.1 |
| Saponification number | 216.5 |
| Iodine number | 83 |
| Acetyl number | 68 |
| Hydroxyl number | 71.4 |
| Reichert-Meissel number | 2.0 |
| Per cent unsaponifiable | Less than 2.5 |
| Per cent nitrogen | 0.0 |
| Per cent SO$_2$ | 0.0 |
| Per cent ash | Trace |
| Specific gravity at 31° C | 0.9574 |
| Refractive index at 31° C | 1.4795 |

6. A filter according to claim 1, wherein said drastically oxidized dehydrated ricinoleic acid body is drastically oxidized castor oil obtained by oxidation of dehydrated castor oil derived by a pyrolytic step in which the amount of distillate removed from the recovered residue was equal to at least about 8% and not more than about 23% by volume of the original castor oil; with the added proviso that the oxidized dehydrated castor oil has substantially the following characteristics:

| | |
|---|---|
| Acid number | 14 to 25 |
| Saponification number | 195 to 240 |
| Iodine number | 70 to 95 |
| Hydroxyl number | 63 to 80 |
| Reichert-Meissel number | Less than 5 |
| Acetyl number | 60 to 75 |
| Specific gravity at 31° C | About 0.9575 |
| Refractive index at 31° C | About 1.4795 | and substantial freedom from unsaponifiable material, nitrogen, SO$_2$, and ash.

7. A filter for use in connection with the lubricating system of an internal combustion engine comprising a casing containing a filtering medium sufficiently porous to permit oil to flow therethrough but sufficiently compact to filter out solid particles, said medium having applied thereto as an agent to increase the dirt removal rate of said filtering medium a drastically oxidized dehydrated ricinoleic acid body.

8. A filter according to claim 7 wherein said drastically oxidized dehydrated ricinoleic acid body is drastically oxidized castor oil obtained by oxidation of dehydrated castor oil derived by a pyrolytic step in which the amount of distillate removed from the recovered residue was equal to at least about 8% and not more than about 23% by volume of the original castor oil.

9. A method of increasing the dirt removal rate of a filtering medium arranged in the lubricating system of an internal combustion engine for removing dirt from the lubricating oil in the system, said method comprising contacting oil in the system that is filtered by said filtering medium with a drastically oxidized dehydrated ricinoleic acid body.

10. A method according to claim 9 wherein said drastically oxidized dehydrated ricinoleic acid body is drastically oxidized dehydrated castor oil.

11. A method according to claim 9 wherein said drastically oxidized dehydrated ricinoleic acid body is drastically oxidized castor oil obtained by oxidation of dehydrated castor oil derived by a pyrolytic step in which the amount of distillate removed from the recovered residue was equal to at least about 8% and not more than about 23% by volume of the original castor oil.

12. A method according to claim 9 wherein said drastically oxidized ricinoleic acid body is drastically oxidized dehydrated castor oil obtained by oxidation of dehydrated castor oil derived by a pyrolytic step in which the amount of distillate removed from the recovered residue was equal to at least about 8% and not more than about 23% by volume of the original castor oil; with the added proviso that the iodine number of said oxidized product is not less than 70, the saponification value within the range of about 195 to about 240, and acetyl value within the range of about 60 to about 75.

13. A method according to claim 9 wherein said drastically oxidized ricinoleic acid body is drastically oxidized castor oil obtained by oxidation of dehydrated castor oil derived by a pyrolytic step in which the amount of distillate removed from the recovered residue was equal to at least about 8% and not more than about 23% by volume of the original castor oil; with the added proviso that the oxidized dehydrated castor oil has substantially the following characteristics:

| | |
|---|---|
| Acid number | 14 to 25 |
| Saponification number | 195 to 240 |
| Iodine number | 70 to 95 |
| Hydroxyl number | 63 to 80 |
| Reichert-Meissel number | Less than 5 |
| Acetyl number | 60 to 75 |
| Specific gravity at 31° C | About 0.9575 |
| Refractive index at 31° C | About 1.4795 | and substantial freedom from unsaponifiable material, nitrogen, SO$_2$, and ash.

DONALD H. WELLS.
MELVIN DE GROOTE.